(12) United States Patent
Cheng et al.

(10) Patent No.: US 9,043,274 B1
(45) Date of Patent: May 26, 2015

(54) UPDATING LOCAL DATABASE AND CENTRAL DATABASE

(75) Inventors: Andy Cheng, Los Altos, CA (US); Venkatraman Naganathan, San Jose, CA (US)

(73) Assignee: Shoretel, Inc., Sunnyvale, CA (US)

( * ) Notice: Subject to any disclaimer, the term of this patent is extended or adjusted under 35 U.S.C. 154(b) by 239 days.

(21) Appl. No.: 13/477,731

(22) Filed: May 22, 2012

(51) Int. Cl.
*G06F 17/00* (2006.01)
*G06F 17/30* (2006.01)

(52) U.S. Cl.
CPC .............................. *G06F 17/30221* (2013.01)

(58) Field of Classification Search
CPC ............. G06F 17/30277; G06F 17/30002; G06F 17/30063; H04L 29/08072; H04L 29/06; H04M 1/57; H04M 3/42042
USPC ......... 707/613, 614, 618, 620, 623, 624, 628, 707/630; 709/203, 209, 211; 379/142, 171
See application file for complete search history.

(56) References Cited

U.S. PATENT DOCUMENTS

| 5,838,909 | A | * | 11/1998 | Roy et al. ...................... 709/209 |
| 5,913,029 | A | | 6/1999 | Shostak |
| 7,158,998 | B2 | | 1/2007 | Bhuyan |
| 7,624,109 | B2 | | 11/2009 | Testardi |
| 7,809,768 | B2 | | 10/2010 | Owens et al. |
| 8,112,395 | B2 | | 2/2012 | Patel et al. |
| 8,117,358 | B2 | | 2/2012 | Labuda et al. |
| 2006/0155945 | A1 | * | 7/2006 | McGarvey .................... 711/162 |

OTHER PUBLICATIONS

Karin Petersen et al., Flexible Update Propagation for Weakly Consistent Replication, 1997, ACM, 288-301.*

* cited by examiner

*Primary Examiner* — Jean B Fleurantin
(74) *Attorney, Agent, or Firm* — Tarolli, Sundheim, Covell & Tummino LLP

(57) ABSTRACT

A non-transitory computer readable medium can include a local management service programmed to receive real-time status information from producer components registered within the local management service. The local management service can also periodically propagate status data to a local database based on the real-time status information, the status data corresponding to changes in the status information for at least one of the producer components. A local system manager can be programmed to push the status data across a network to a central system manager to facilitate a storing of the status data in a central database, wherein the status data pushed to the central system manager includes only status data changed in the local database.

27 Claims, 8 Drawing Sheets

UPDATING LOCAL DATABASE AND CENTRAL DATABASE

TECHNICAL FIELD

Systems and methods for updating a database are disclosed. In particular, systems and methods for updating a local database and a central database are disclosed.

BACKGROUND

A database is an organized collection of data, in digital form. The data in a database can be organized to model relevant aspects of reality, in a way that supports processes that require this information. A database can have a model that describes a theoretical foundation of the database and fundamentally determines in which manner data can be stored, organized, and manipulated in a database system.

A hierarchical database model is a database with a data model in which the data is organized into a tree-like structure. The structure allows representing information using parent/child relationships in which each parent can have many children and each child has one parent (also known as a 1-to-many relationship).

SUMMARY

This disclosure relates to systems and methods for updating a local database and a central database.

In one example, a non-transitory computer readable medium can include a local management service programmed to receive real-time status information from producer components registered within the local management service. The local management service can also propagate status data to a local database based on the real-time status information, which can be performed periodically or asynchronously based on the status data. The status data stored in the local database corresponds to changes in the status information for at least one of the producer components. A local system manager can be programmed to push the status data across a network to a central system manager to facilitate a storing of the status data in a central database, wherein the status data pushed to the central system manager includes only status data changed in the local database.

In another example, a system can include a central server communicatively coupled to a plurality of local servers over a network. Each local server can include a local management service programmed to receive real-time status information from producer components registered within the local management service and periodically propagate status data to a local database based on the real-time status information, the status data corresponding to changes in the status information for at least one of the producer components. The local server can also include a local system manager programmed to push the status data across a network to a central system manager of the central server to facilitate a storing of the status data in a central database, wherein the status data pushed to the central system manager includes only status data changed in the local database. The central system manager of the central server can be programmed to receive the status data from the local system manager associated with each of the plurality of local servers and to write the status data to a central database in a record associated with the given local server.

In yet another example, a method can include receiving current status information from a given producer component of a plurality of producer components registered with a local server and determining status data for the given producer component based on the received status information. The method can also include periodically updating a local database associated with the local server based on the determined status data. The status data can be sent from the local database to a central database, wherein the status data sent to the central system manager includes only status data changed in the local database.

DETAILED DESCRIPTION

Figure 1:
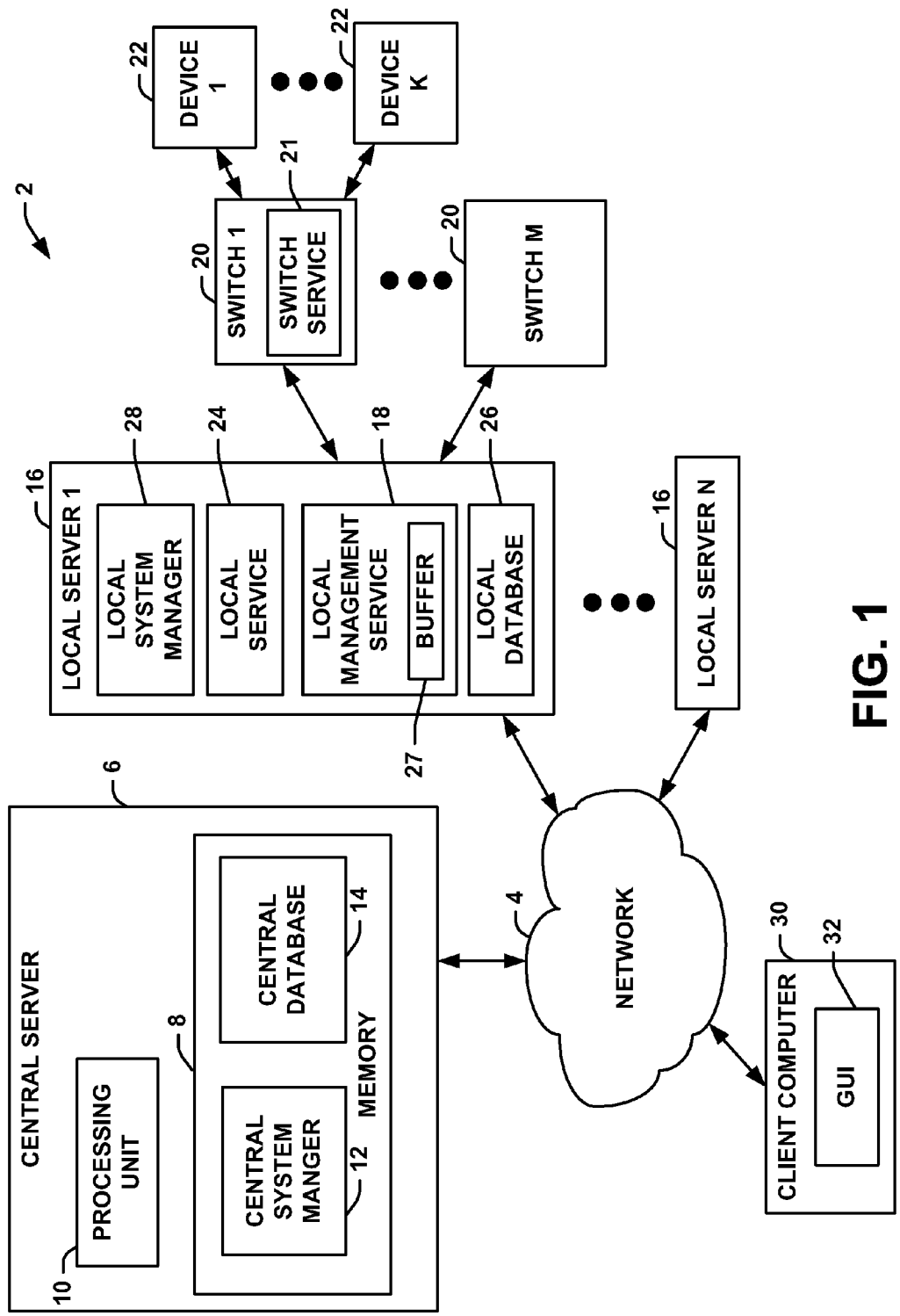
FIG. 1 illustrates an example of a system for managing a hierarchical database system.

FIG. 1 illustrates an example of a system 2 for managing a hierarchical database over a network 4. The network 4 could be a public network (e.g., the Internet) a private network or combination thereof. In some examples, the system 2 could be implemented as a telecommunication system.

The system 2 can include a central server 6 that could be implemented, for example, as a computer. As used herein, the term "central" is not intended to denote information about location, but instead refers to its hierarchical status in the system 2. The central server 6 can include a memory 8 for storing machine-readable instructions. The memory 8 could be implemented, for example, as volatile memory (e.g., random access memory), nonvolatile memory (a hard disk drive, a solid state drive, flash memory or the like) or a combination thereof. The central server 6 can also include one or more processing units 10 to access the memory 8 and execute the machine-readable instructions. The processing unit 10 can be implemented, for example, as including a processor core.

The memory 8 can include a central system manager 12 that can read and write data (e.g., manage data) to and from a central database 14 (e.g., a central repository) that can be stored in the memory 8 of the central server 6. It is to be noted that while the present examples illustrate the central database 14 as being integrated with a central system, in other examples, the central database 14 could be stored externally to the central system.

The system 2 can also include N number of local servers 16 that can communicate with the central server 6 via the network 4 (where N is an integer greater than or equal to one). Each of the N number of local servers 16 can be implemented as a computer and, as mentioned with respect to the server 6, can include a processing unit and memory that stores instructions and data. For purposes of simplification of illustration, only contents of LOCAL SERVER 1 (hereinafter referred to as the "first local server 16") are included; however, each of the 2-N local servers 16 can be implemented in a similar manner. For example, the signaling between servers 6 and 16 can be implemented via a JavaScript Object Notation (JSON) message format, such as for sending the updates, notifications and commands as structured data over the network 4.

The first local server 16 can include a local management service 18 that executes on the first local server 16 (e.g., in a memory of the first local server 16). A plurality of producer components can be registered for operation in the system 2. The producer components can be any hardware and/or software component that is registered with the service for which the system can monitor or control its configuration and/or operation. For example, in the context of a telecommunication system, producer can include switches or communication devices, interfaces, voicemail service, telecommunication management service, a conference bridge service, an instant messaging service and the like.

In the example of FIG. 1, the local management service 18 can communicate with M number of switches 20, where M is an integer greater than or equal to zero. For example, the local server 16 can be programmed to manage each such switch 20 and other devices 22. It is noted that in other examples, the first local server 16 and a switch 20 (or some subset thereof) can be collocated in a single appliance. As yet another example, the local server 16 can be utilized to provide one or more telecommunication services (e.g., voicemail service) within the system, and one or more switches 20 and other devices in the system 2 can be actively managed by one or more different servers (not shown).

As one example, the local management service 18 can be implemented as a telecommunications management service (TMS) programmed to control and monitor the status of associated producer telecommunication devices 20 and 22. In some examples, the first local server 16 can communicate with each of the M number of switches 20 over a private network (e.g., a local area network). In other examples, the first local server 16 can communicate with each of the M number of switches 20 over the network 4. Additionally, the first local server 16 may communicate with the switches 20 via different networks, such as including one or more private networks as well as the network 4.

By way of example, each of the switches 20 can be implemented as a telephony switch that can route connections (e.g., telephone calls and/or data connections) to and from K number of the devices 22, where K is an integer greater than or equal to zero. A connection between the first local server 16 and each of the K number of switches 20 can be secured or unsecured. Each of the K number of devices 22 could be implemented, for example, as a wired telephone (e.g., a digital phone, a desktop IP phone, a POTS phone or the like), a mobile phone, a videoconferencing terminal, a computer, an application running on a computer, and the like. While, for purposes of simplification of explanation, FIG. 1 only illustrates a set of device connected with the first switch 20 (labeled in FIG. 1 as "SWITCH 1"), it is to be understood that each the 2-N switch 20 could be implemented in a similar manner.

In some examples, each component of the central server 6, the N number of local servers 16, the M number of switches 20 and the K number of devices 22 can be implemented as virtualized hardware. For instance, each of the illustrated components of the system 2 can be implemented on a virtual machine that can include a virtual processor and virtual memory that are executing on a host machine.

As a further example, each switch 20 can be implemented as hardware and/or software that channels incoming data from any of multiple input ports to a specific output port to take the data toward its intended destination. In the traditional circuit-switched telephone network, one or more switches are used to set up a dedicated though temporary connection or circuit for an exchange between two or more parties. On an Ethernet local area network (LAN) or a wide area network (WAN), the switch determines from an address in each incoming message packet which output port to forward the packet to, for example.

The first switch 20 can include a switch service 21 that executes on the switch 20. The switch service 21 can be implemented, for example, as a telephony service, such as a voicemail service. In such a situation, the switch service 21 can store voice mailboxes (e.g., as files) for each of the K number of devices 22, or some subset thereof. Each of the voice mailboxes can include, for example, personal information an associated user (e.g., PIN, a greeting or the like) for, as well as voice messages for the associated user.

In some examples, a given device 22 can be in continuous communication with the first switch 20, such as where the given device 22 is implemented as a wired telephone. In other examples, the given device 22 can be in intermittent communication with the first switch 20, such as examples where the given device 22 is implemented as a mobile phone or a smartphone. In either situation, the given device 22 can provide a status signal (e.g., a real-time status update) to the first switch 20. For instance, the status signal could indicate that the given device 22 is ready to receive and/or initiate a telephone or data connection with another device 22 via the first switch 20, where the other device 22 may or may not be coupled to the first switch 20.

The first local server 16 can also include one or more local services 24 that can be implemented as a computer application for providing services to the M number of switches 20 and/or the K number of devices 22. Such services could include, for example, voice services, such as voicemail, conference bridging or the like. The local service 24 can include local configuration data that includes, for example, parameters for set up and operation the local service 24. Additionally, the local service 24 can include status data characterizing status information of services provided by the local service 24. As disclosed herein, the status data can include hierarchical status for components at each level that is managed by or within the context of the local service 24. The switches 20, devices 22 as well as applications executing within the system 2 can transfer status information to the local server 16 according a predefined JSON format, for example. Other message formats can also be utilized.

The local management service 18 of the first local server 16 can monitor the status of the local service 24. For instance, during initial setup, the local management service 18 can poll the local service 24 for configuration data and status data. The local management service 18 can store the configuration data and the status data for the local service 24 in a local database 26. The local management service 18 can also poll each of the M number of switches 20 for configuration data and status data. The status data of the M number of switches can include a status of devices internal to the switches 20, such as a status of fans, trunk channels, logical software devices (e.g., route points or soft extensions) or the like. The status data can also include a status of the switch service 21 executing on the first switch 20. Upon receiving a response to the poll, the local management service 18 can write the configuration data and the status data of each of the N number of switches 20 into the local database 26. Additionally or alternatively, in some examples, the local management service 18 and the switches 20 can include an application programming interface (API) that communicate to facilitate the transfer of configuration data and status data between the switches 20 and the local management service 18. Similarly, the local management service 18 can write corresponding configuration data and status data of devices 22 into the local database 26. The local database 26 can be implemented as a child of the central database 14, such that the local database 26 and the central database 14 have a hierarchical relationship. As an example, the local database 26 can be implemented as a local heap status cache that is optimized for speed and ease of access of the status data stored therein. In some examples, the local database 26 and the central database 14 can be implemented to employ the same primary keys for objects stored therein. In this way, upon writing, modifying or deleting objects from the local database 26 and the central database 14, primary key consistency issues can be avoided.

Additionally, during normal operation after initial set up, the local management service 18 of the first local server 16 can be programmed to monitor the status of each of the producer components registered with the local server 16, including the M number of switches 20 (and their associated internal devices), the switch service 21, each local service 24 and each device 22 registered therewith. For instance, each of the M number of switches 20 can provide the local management service 18 with real-time status of each of the associated devices 22. Additionally, each of the M number of switches 20 can include configuration data that characterizes parameters of the associated switch 20, as well as status information related to the internal devices and/or a switch service 21 of the associated switch 20. In some examples, each of the M number of switches 20 can also provide firmware information and/or connectivity information related to each of the M number of switches 20 and/or each of the K number of devices 22. The local management service 18 can aggregate the real-time status information received from each local service 24, switches 20 and devices 22 in a buffer 27.

For example, the status information being aggregated for a local management service 18 of a given server 16 corresponds to those producers that operate within the context of each given server. That is, each server 16 can roll up only that status information which it receives from its associated producers 20, 22 and 24. As disclosed herein, each server 16 rolls up its status information to the central database 14 periodically (or asynchronously—depending on the type of status information). The central system manager 12 can further aggregate the status information that is rolled up from each local server 16 and provide a corresponding system level view of such status information. The system level view of such status information can be based on analysis of logical and physical connections in the system 2.

As a further example, the system level view of status information can include status across various hierarchical levels (e.g., logical levels of hierarchy) that are implemented within the system 2, which may include combinations of information more than that which is available from any one server 16. For example, a given site can be a logical group of servers and producers that includes more than one switch 20, and different switches for the given site can be managed by different ones of the servers 16. The central system manager 12 thus can glean a complete representation of status information across the system, including site level status, by aggregating status information from different local servers 16 to provide such aggregate status information. The central server 6 can perform such final aggregation of status information for each level of hierarchy that is implemented in the system.

In some examples, the real time status provided by a given switch 20 can include a connectivity status that characterizes connectivity between the given switch 20 and each of the other switches 20 in the system 2. For instance, the connectivity status can include a list of the switches 20 that the given switch 20 is currently connected to.

The local management service 18 can determine status data for producer components corresponding to status information that has changed for each such producer component. The local management service 18 further can analyze the status data. In some examples, analysis of the status data can include an analysis of the connectivity status of each of the M number of switches (e.g., those switches that are monitored by each respective server 16). In such a situation, the status data can include changes to an optimized connectivity list for the M number of switches. To generate the optimized connectivity list, different techniques can be employed. In a first example technique, the local management service 18 can analyze the connectivity status of each of the M number of switches 20 to determine a list of disconnected switches as the optimized connectivity list, since a disconnected switch will not be connected to any of the M number of switches 20. Moreover, in many environments of application, the list of disconnected switches can be relatively small since most switches 20 (often 98% or more) of the switches 20 are not disconnected. In a second example technique, the local management service 18 can determine a list of connected switches 20 as the optimized connectivity list based on the connectivity status from each of the M number of switches 20. The second technique may be employed by the local management service 18 if the local management service 18 determines that the second technique would result in a more optimized (e.g., smaller) connectivity list than the first technique, such as situations where a relatively large number of switches 20 (e.g., greater than 50%) are disconnected. Based on the analysis of the buffered status information, the local management service 18 can selectively periodically or asynchronously propagate the status data to the local database 26. As disclosed herein, most types of status information can be propagated periodically to the local database 26. Certain types of status information (e.g., corresponding to predetermined types of events) can be propagated asynchronously in real time to the local database.

Additionally, in some examples, the local management service 18 can notify (e.g., via a message or other type of signaling) a local system manager 28 of the first local server 16 that a change to the local database 26 has occurred. In other examples, the local management service 18 can periodically (e.g., about every 30 seconds) examine the local database 26 to determine if a change to the local database 26 has occurred. In either situation, the local system manager 28 can push the configuration data and the status data for the local service 24, each of the M number of switches 20 and each of the K number of devices 22 to the central system manager 12 of the central server 6. The connection between the local system manager 28 and the central system manager 12 can be secured or unsecured. For example, the local system manager 28 can send updates periodically to reflect changes that have occurred since the last update was sent. The central system manager 12 can store the configuration data and the status data in a database record associated with the first local server 16 in the central database 14. In this manner, the central database 14 can store the configuration data and the status data for each of the N number of local servers 16.

In some examples, the central system manager 12 can examine the optimized connectivity list (or changes to the optimized connectivity list) in the status data pushed by the local system manager 28 to determine a connectivity matrix for the system 2 that can be stored in the central database 15. The connectivity matrix can be implemented as a matrix that lists connectivity between each of the switches 20 in the system 2. The connectivity matrix can be derived from optimized connectivity lists provided from the N number of local servers 16. For example, the connectivity lists can be implemented as a list of disconnected switches 20 such as to reduce the amount of data in a given list during normal operations that is sent through the network. As another example, the connectivity list can provide a list of disconnected switches 20 or a list of connected switches 20.

During operation, changes to the system 2 can occur intermittently and/or periodically. The local management service 18 can receive a real-time status from each of the M number of switches 20 and the K number of devices 22 in response to a poll. Each status can indicate, for example, a health (e.g., online status) of a switch 20 or device 22, a connection status or the like. Upon the collection and/or determination of the status of the M number of switches 20, periodically (e.g., about every 30 seconds), the local management service 18 can examine the local database 26 to determine if the status and/or configuration of any of the M number of switches 20 has changed since the last time that the local database 26 is updated, any of which changes can collectively be referred to as a status change. If it is determined that a status change has occurred, the local management service 18 can write status data characterizing the status change to the local database 26. The status data can include a metric such as local timestamp, a sequence number or the like that identifies a time local to the first local server 16 when the status data was written to the local database 26.

In some examples, in response to writing the status data to the local database 26, the local management service 18 can notify (e.g., signal) the local system manager 28 that the status data has been written to the local database 26. In other examples, the local system manager 28 can periodically (e.g., at about the same frequency that the local management service 18 writes to the local database 26), examine the local database 26 to determine if an update to the local database 26 has occurred. In either situation, the local system manager 28 can obtain (e.g., pull) the status data that characterizes the status change from the local database 26 and send (e.g., push) the status data to the central system manager 12 of the central server 6. The central system manager 12 can also record the status data in the database record associated with the local server 16, and the database record can be stored in the central database 14. The central system manager 12 can include a central timestamp with the status data that is written to the database record in the central database 14. The central timestamp can record the time, local to the central server 6, when the database record is written in the central database 14 associated with the first local server 16. In some examples, the push of the status data to the central system manager 12 occurs at about the same frequency as the local management service 18 writes to the local database 26. This occurs in some examples since the local management service 18 can notify the local system manager 28 of the writing of the status data to the local database 26, and the local management service 18 updates the local database 26 periodically. Additionally, this occurs in other examples since the local system manager 26 is programmed to examine the local database 26 for updates with about the same frequency that the local management service 18 updates the local database 26.

As another example, the local system manager 28 can determine that a given status change should not be stored in the local database 26 or be pushed to the central system manager 12. For instance, the status of a given device 22 can rapidly change from "connected" to "disconnected" and vice versa. Each such status change may not need to be reflected in the central database 14 of the central server 6 or in the local database 26. Thus, the local management service 18 can include a filter function programmed to examine the status of each of the M number of switches 20 and/or each of the K number of devices 22 to determine if the status data written to the local database 26 should include the given a status change.

In some examples, the local system manager 28 can also include an event detector that can detect events corresponding to certain types of status information, which should be recorded in the local database 26 and the central database 14 as soon as practical (e.g., in real-time, asynchronously) and sooner than the update rate of the periodic updates. For instance, if the first switch 20 is rebooted, upon reboot, the local management service 18 can receive a real-time update of the status of the first switch 20. In such a situation, the local management service 18 can immediately (e.g., asynchronously) write the status data characterizing the updated status to the local database 26 (e.g., in between the periodic update of the local database 26). In another example, the event detector of the local management service 18 can detect that the given switch 20 is down/offline by detecting that the given switch 20 is no longer providing real-time updates of its status to the local management service 18. In such a situation, the local management service 18 can asynchronously write status data that can set the status of the given switch 20 and the associated devices 22 connected thereto to "offline" or some equivalent status. In these situations, the local management service 18 can notify (e.g., signal) the local system manager 28 that status data has been written to the local database 26 such that the status data can be updated in the central database 14 in substantially real time.

Employment of the system 2 can ensure a high degree of sanity for data stored at the local database 26 and the central database 14. For instance, the central system manager 126 can include a heartbeat that records every time that one of the local management system manager 28 on a given one of the N number of local servers 16 pushes a status change to the central system manager 12. The heartbeat can be provided with the status data or via separate signaling (e.g., JSON message format, XML message or the like). Should the central system manager 12 fail to receive the status update from a given local server in a certain period of time (e.g., 2 minutes), the central system can update the central database 14 record associated with the given local server 16. The equivalent status can also be updated locally to reflect the absence of the heartbeat. The update, for example, can involve invoking a clean-up operation to remove records that may be considered stale (e.g., older than the last heartbeat or expected update).

The central system manager 12 can monitor and maintain the overall status of the system 2, and the status information can be stored in the central database 14. In some examples, a client computer 30 can be coupled to the network 4. The client computer 30 can be implemented, for example, as a desktop computer, a laptop computer, a mobile device 22 (e.g., a tablet computer or a smartphone) or the like. The client computer 30 can include a graphical user interface (GUI) 32 to communicate with the central system manager 12. There can be any number of one or more client computers 30, each of which can implement an instance of the GUI 32. In one example, the GUI 32 can, in response to a user input, provide a request to the central server 6 for data characterizing a status of the system 2. In response, the central system manager 12 can query the central database 14 and provide the response to the query (e.g., requested data) to the client computer 30. The user of the client computer 30 can view (e.g., in graphical form) a status of the central server 6, the N number of local servers 16, the M number of switches 20 and the K number of devices 22.

Additionally, in response to user input, the GUI 32 can request changes to the system 2. For instance, in one example, in response to the user input, the GUI 32 can provide a request to the central system manager 12 to reboot the first switch 20.

In response to the request, the central system manager 12 can communicate with the local system manager 28 of the first local server 16 to propagate a reboot command for the first switch 20. Upon receiving the reboot command for the first switch 20, the local system manager 28 of the first local server 16 can notify (e.g., signal) the local management service 18 of the reboot command for the first switch 20. In response to receiving the reboot command for the first switch 20, the local management service 18 can command the first switch 20 to reboot and write a status change to the local database 26. In other examples, changes such as a device 22 reboot, a switch 20 and/or a device 22 deletion or addition or the like can additionally or alternatively be propagated through the system 2 via messaging. By employment of the client computer 30, the user can make changes to the system 2 that can be propagated to the appropriate hierarchical level (e.g., the first switch 20).

The system 2 also helps reduce network traffic. For instance, since the local database 26 is only updated periodically (with the exception of the asynchronous updates), chatter due to rapidly changing statuses of devices 22 need not be written to the local databases 26 of the N number of local servers 16. Moreover, reducing the updates to the local databases 26 can reduce the amount of data pushed by the local system manager 28 to the central system manager 12. Further, since only the changes to the local databases 26 are pushed to the central system manager 12 (as opposed to replicating the entire contents of the local database 26), network traffic can be still further reduced. Such a reduction of network traffic and a reduction of chatter at the local database 26 can allow for a relatively high degree of scalability of the system 2, such that the system 2 can service a relatively large number of appliances (e.g., local servers 16, switches 20 and devices 22).

Figure 2:
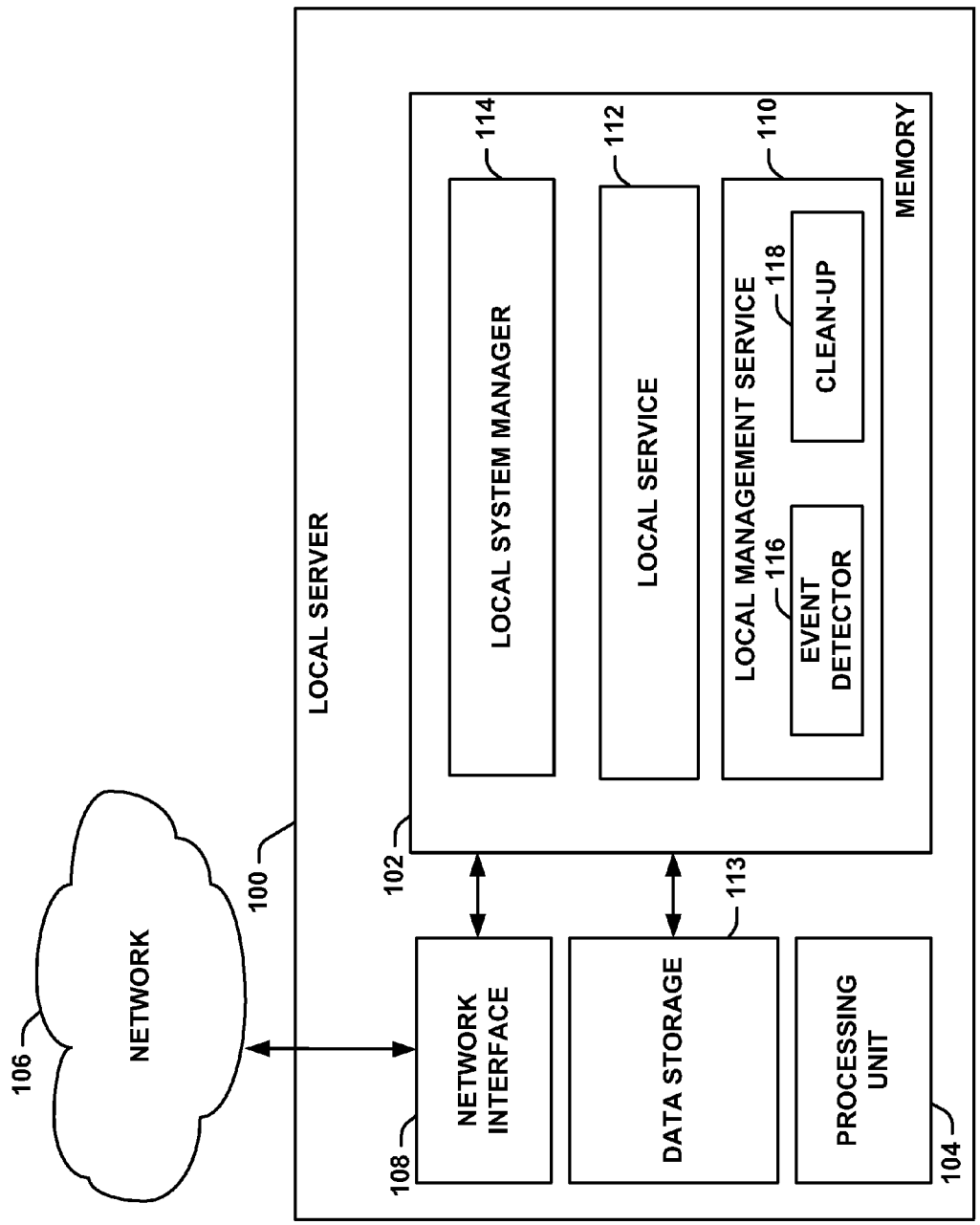
FIG. 2 illustrates an example of a local server.

FIG. 2 illustrates an example of a local server 100 that can be utilized to implement the first local server 16 illustrated in FIG. 1. The local server 100 can include a memory 102 for storing machine readable instructions. The memory 102 could be implemented, for example, as random access memory, flash memory, a hard disk, a combination thereof or the like. The local server 100 can also include a processing unit 104 that can access the memory 102 and execute the machine readable instructions. The processing unit 104 can be implemented, for example, as a processor core. The local server 100 can be coupled to a network 106 via a network interface 108, which could be implemented as a network interface card. The network 106 could be implemented, for example, as a cellular data network (e.g., 3G or 4G network), a public network (e.g., the Internet) or a combination thereof.

In some examples, the local server 100 can be connected via the network 106 to M number of switches (e.g., the switches 20 illustrated in FIG. 1) and K number of devices (e.g., the devices 22 illustrated in FIG. 1). The memory 102 can include a local management service 110 that can monitor the status of the M number of switches and the K number of devices.

The memory 102 can include one or more local services 112, each of which can provide, for example, voice services (e.g., voice mail, conference bridging, instant messaging, call control or the like) to the M number of switches and K number of devices. During an initial setup, the local service 112 can provide a status and configuration data to the local management service 110. Additionally, during the initial setup, the local management service 110 can receive configuration data and a status from each of the M number of switches and each of the K number of devices. The local management service 110 can propagate status data and the configuration data into corresponding status tables of a local database that is stored in the data storage 113 based on the received statuses and the configuration data. As disclosed herein, the status the local management service 110 can selectively propagate the status data, either asynchronously or periodically to the local database in the data storage based on analysis of the status data. The data storage 113 could be implemented, for example, as memory (e.g., volatile or non-volatile). The data storage 113 can correspond to non-persistent memory that is optimized for speed and a relatively high ease of access (e.g., a local heap status cache).

Upon writing the configuration data and the status data to the tables in the data storage 113, in some examples, the local management service 110 can notify (e.g., signal) a local system manager 114 stored in the memory 102 that an update to the local database has occurred. In other examples, the local system manager 114 can be programmed to periodically (e.g., about every 30 seconds) examine the local database 26 to determine if an update has occurred. In either example, the local system manager 114 can query the local database in the data storage for updates in the configuration data and the status data since the last update. The local system manager 114 can then communicate with a central system manager (e.g. the central system manager 12 illustrated in FIG. 1) via the network 106 to ensure that the configuration data and the status data are backed up in a central database (e.g., the central database 14 illustrated in FIG. 1). The local database can store a proper subset of the data that is stored in the central database, such that the local database in each respective local server and the central database have a hierarchical relationship.

Additionally, the local management service 110 can be programmed to monitor the status of the local service 112 and the M number of switches and the K number of devices in real time. For instance, the local management service 110 can include a heartbeat function to ensure that real-time updates on the status of each of the M number of switches, the K number of devices and the local service 112 is received, which real-time updates can be referred to as status updates. Upon reception of the status updates, the local management service 110 can examine the status updates to determine status data that can include data characterizing which updated statuses should be written to the local database. The updated status information can be a subset of the status update, such that an updated status can be omitted from the status data. Periodically, (e.g., about every 30 seconds), the local management service 110 can write the status data to the local database. The data written to the local database can include a timestamp based on a local clock of the local server 100. Additionally, in some examples, the local management service 110 can notify (e.g., signal) the local system manager 114 that the status data has been updated base on the local timestamp (or other metric) relative to a reference corresponding to when the last time status updates were written to the local database. In other examples, the local system manager 114 can periodically (e.g., about every 30 seconds) examine the local database to determine if an update to the local database has occurred. In either example, the local system manager 114 can query the local database to determine updates to the status data in the local database. Upon such a determination, the local system manager 114 can push the status data that has been updated to the central system manager such that the updates to the status data can be propagated to and stored in the central database.

The local management service 110 can include an event detector 116 that can be programmed to monitor an event corresponding to a predetermined type of status information that needs to be updated (e.g., asynchronously) in the local database and propagated to the central database more immediately than the periodic updates that are performed. Such events can include, for example, rebooting of a component, adding a device or service, deleting a device or service, and/or a change a health of a component, such as a fan, a disk drive or the like. The event detector 116 can identify such events and, in response, send a notification or take other action based on rules that can be stored in the data storage 113. Examples of status events can include reboot of a device or service, adding a device or service, deleting a device or service As an example, after a reboot of one of the M number of switches has been completed, the event detector 116 can signal the local management service 110 to immediately poll the rebooted switch for configuration data and/or a status update. Additionally, the local management service 110 can asynchronously (e.g., immediately) determine and write status data and/or the configuration data for the rebooted switch before the next periodic update of the local database occurs. Additionally, the local management service 110 can notify (e.g., signal) the local system manager 114 that the update to the status data and/or the configuration data for the rebooted switch has occurred, such that the local system manager 114 can push the update of the status data and/or the configuration data to the central system manager for update in the central database.

In some examples, a communications channel can be provided to enable the local system manager 114 to receive commands for the local server 100, one of the M number of switches and/or one of the K number of devices. The local system manager 114 can notify (e.g., signal) the local management service 110 of the command and the local management service 110 can propagate the command to the local service 112, the switch or the device.

For example, the local system manager 114 can receive an add command that indicates that a new switch and/or device is to be added. The add command can include configuration data for the added switch and/or device. The configuration data can also include a unique identifier for the added switch and/or device. The add command can be pushed from the local system manager 114 to the local management service 110. The local management service 110 can store the configuration data in the local database. Additionally, upon the local management service 110 receiving a signal from a switch and/or a device that includes the unique identifier, the local management service 110 can push the configuration data to the switch and/or the device identified in the add command and instruct the associated switch and/or the associated device to employ the configuration data.

As a further example, the status data in the local database can include an indication (e.g., a programmable column in the status heap tables) indicating whether a status data element has been deleted. For example, a phone can be moved, trunks can be deleted, a switch can be deleted and the like. As disclosed herein, since the local management service sends only the changes in status data from the local database, if status information for a deleted object were deleted automatically in response to deletion of the object (e.g., by the local service 112), the deletion would not be noticed/processed by the local management service. To address this, the local service 112 can be programmed to tag corresponding status data for deletion in the configuration data. The local management service 110 can include a clean-up function 118 that can propagate changes in the configuration data corresponding to a deletion by setting a flag in a delete column for such object row of the status table of the local database.

The clean-up function 118 can also be programmed to cascade deletions through a hierarchical status objects based on what object is being deleted. For instance, if a switch is deleted, in addition to marking the switch status data for deletion (e.g., a switch status row of a heap table), the clean-up function 118 can cascade the deletion (e.g., by setting a delete flag) for switch status to encompass status for each other device that resides within the context of the switch, such as port, hunt group, associated interfaces and devices (e.g., telephones) registered with the switch. Setting the delete flag corresponds to a status change that results in timestamp data for each object being stored for the status data. Thus, when the local management service 110 queries the local status database for all data that has changed since the last timestamp, the local management service can send the changes to the central system manager for storage as updated status data in the central database. Additionally, as the local management service 110 provides the status updates, the clean-up function 118 can delete all data elements (e.g., rows in the heap table) that include the delete flag set. As another example, if the clean-up function 118 is not programmed to cascade deletions when the local service 112 performs the deletion, the clean-up function can be programmed to implement the deletion of status data when the local management service propagates the changes in the status data.

FIGS. 3-6 depict timing diagrams for examples of different methods that can be utilized for different database management scenarios, such as for managing a hierarchical database. In the examples of FIGS. 3-6, the data transferred between different components can be provided over a network (e.g., a public and/or a private network).

In each of the examples illustrated in FIGS. 3-6, a system can include a central server 200 (e.g., the central server 6 illustrated in FIG. 1). The central server can include a central database (CDB) 202 and a central system manager (CSM) 204. The central server 200 can communicate with a local server 206 (e.g., the local server 16 illustrated in FIG. 1 and/or the local server 100 illustrated in FIG. 2) over a network infrastructure such as disclosed herein. The local server 206 can include a local system manager (LSM) 208, a local database (LDB) 210, a local service 212 ((LS) e.g., voice services) and a local management service (LMS) 214, as disclosed herein. The local server 206 can communicate with a switch 216, such as a telecommunications switch (e.g., the switch 20 illustrated in FIG. 1). The switch 216 can communicate with another producer component, such as a communication device 218 (e.g., one of the devices 22 illustrated in FIG. 1). FIGS. 3-6 demonstrate example scenarios for managing a hierarchical database, as disclosed herein, the system illustrated can be implemented in other examples by employing different types of signaling (e.g., according to any known or yet to be developed signaling protocols, such as a predefined JSON format).

While, for purposes of simplicity of explanation, the example methods of FIGS. 3-6 are shown and described as executing serially, the present examples are not limited by the illustrated order, as some actions could in other examples occur in different orders and/or concurrently from that shown and described herein. Moreover, it is not necessary that all disclosed actions be performed to implement a method. Further, for simplicity of explanation, it is noted that not all of the components are illustrated in each of the FIGS. 3-6.

Figure 3:
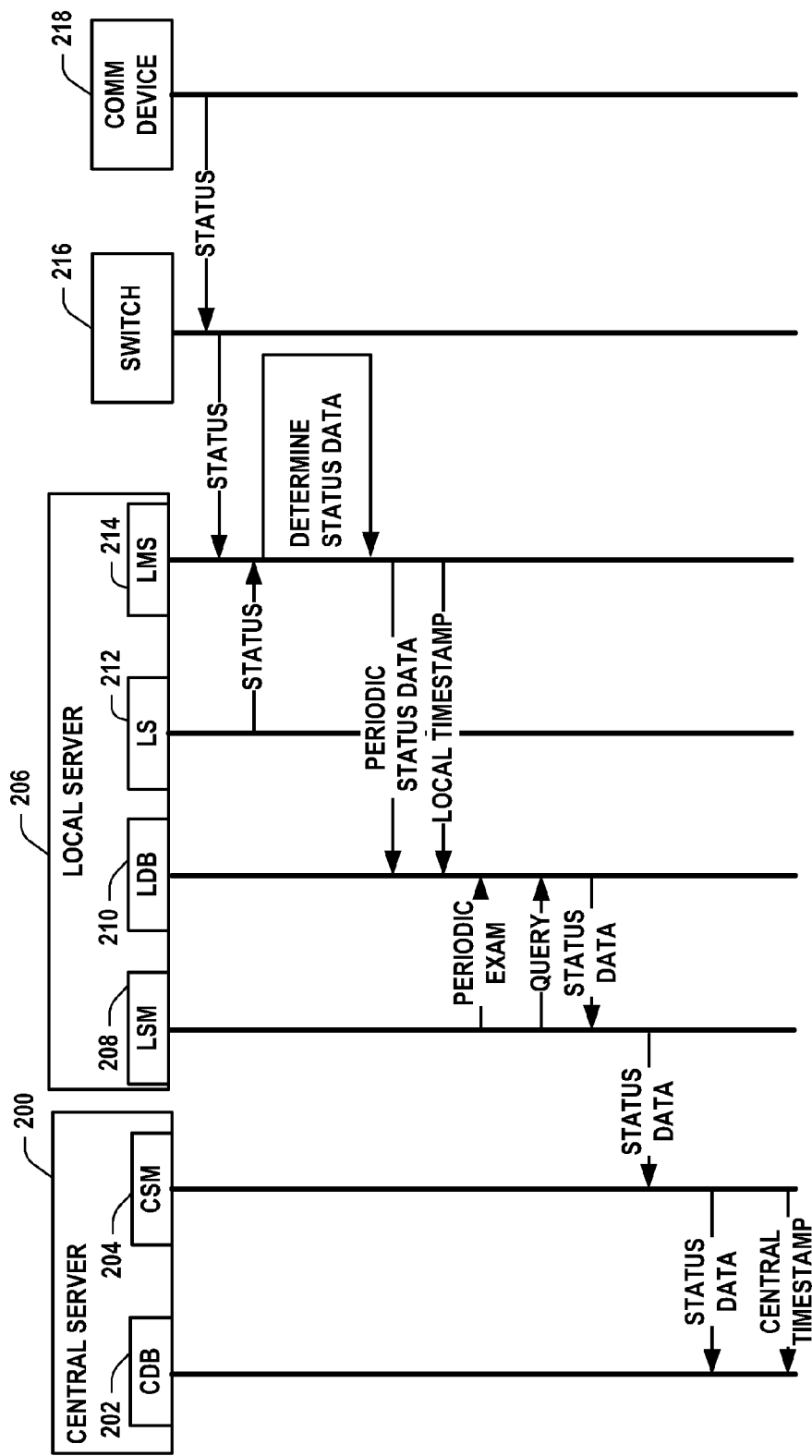
FIG. 3 illustrates an example of a flow chart of periodically updating a status in a hierarchical database.

FIG. 3 depicts an example of a method that can be implemented for periodically updating status for the local service 212, the switch 216 and the communication device 218. At the start of the method process it is presumed that the communication device 218 is communicatively coupled (e.g., registered) with the switch 216, and that the switch 216 is communicatively coupled (e.g., registered) with the local management service 214 of the local server 206, and that configuration data and status for the local service 212, the switch 216 and the communication device 218 are stored in the local database 210 and the central database 202.

The communication device 218 can provide status information to the switch 216. Moreover, the switch 216 can provide status information to the local management service 214 that includes the data characterizing the status of the switch 216 and the status of the communication device 218. The local management service 214 can also receive status information from the local service 212.

The local management service 214 can determine status data based on the received statuses from the local service 212, the switch 216, and the communication device 218. The status data can be data that characterizes a subset of the statuses provided by the local service 212, the switch 216 and the communication device 218. For instance, in some examples, the status data may omit a connection and/or a disconnection of a voice and or a data connection for the communication device 218.

Upon the determination of the status data, the local management system 214 can write a periodic update to the local database 210. In some examples, the period for providing the status data could be about 30 seconds. By only providing status updates periodically for that portion of data that has changed since the last update, a reduction of chatter at the local database 210 can be achieved.

As disclosed herein, the update to the local database 210 can include a metric such as a local timestamp based on a local clock of the local server 206, a sequence number or the like. The local system manager 208 can be configured/programmed to periodically (e.g., about every 30 seconds) examine the local database 210 to determine if an update to the local database 210 has occurred. In other examples, the local management service 214 can notify (e.g., signal) the local system manager 208 that a status update to the local database 210 has occurred. The local system manager 208 can query the local database 210 for the status data that has changed since the last update period. The local system manager 208 can provide the central system manager 204 with the status data based on the results to the query. The central system manager 204 can write the status data to the central database 202. The central system manager 204 can also write a central timestamp to the status data that is based on a local clock of the central system. Since metrics such as local timestamps are used at each server 200 and 206, the system facilitates accurate understanding about the validity of the status data.

By employment of the method illustrated in FIG. 3, the central database 202 can be updated periodically after the local database 210 is updated. Moreover, network traffic can be reduced by the periodic updating as well as including only changes to the local database 210 in the status data provided to the central system manager 204 by the local system manager 208.

Figure 4:
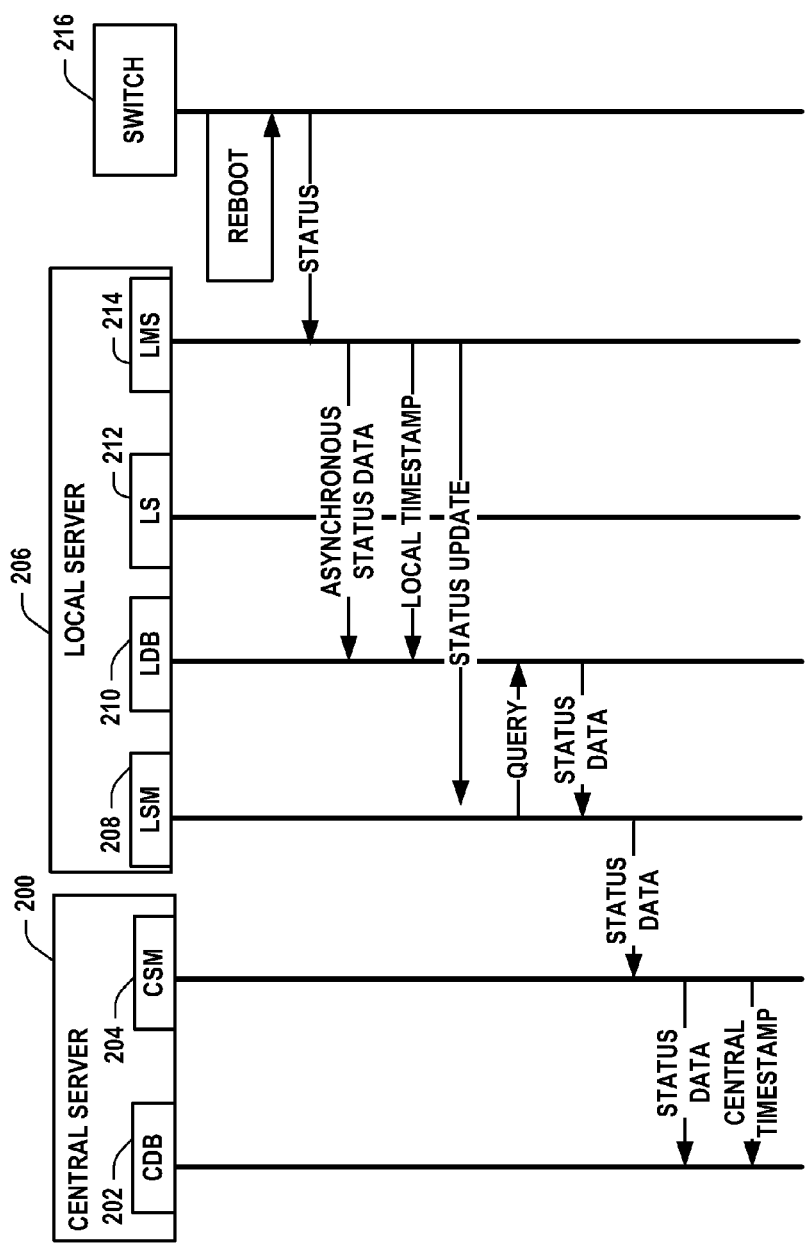
FIG. 4 illustrates an example of asynchronously updating a status in a hierarchical database.

FIG. 4 depicts an example scenario of a method implemented for asynchronously updating status of the switch 216, which can occur outside of timing established by periodic updates. While the example of FIG. 4 is in the context of updating status of a switch, the workflow is equally applicable to other types of devices and applications for which asynchronous updates may be desired. Additionally, asynchronous updates can be programmed for different types of events deemed to be time sensitive for a given type of device or application.

At the start of the method it is presumed that the communication device 218 (illustrated in FIG. 3) is communicatively coupled (e.g., registered) with the switch 216, and that the switch 216 is communicatively coupled (e.g., registered) with the local management service 214, and that configuration data and status for the local service 212, the switch 216 are stored in the local database 210 and in the central database 202.

In the example of FIG. 4, the switch 216 can perform a reboot, which may be initiated in response to a user input (e.g., at the switch or remotely) or automatically. The switch 216 can provide a real-time status of the switch 216 to the local management service 214, which real-time status can indicate that the reboot has been completed. The local management service 214 (e.g., the event detector 116 of FIG. 2) can detect an event (the reboot or other event) that requires an asynchronous update to the local database 210. In other examples, instead of the reboot, the event could be a failure to receive a status of the switch 216 or another event. The local management service 214 can be programmed to perform such asynchronous updates for different types of devices and/or event types based on rules stored in the local database 210, for example.

The local management service 214 can asynchronously provide the local database 210 was status data characterizing the status of the switch 216. The local management service 214 can also write a metric, such as local timestamp, a sequence number or the like with the status data based on a local time of the local server 206. The local management service 214 can notify (e.g., signal) the local system manager 208 that an asynchronous status update has occurred. The local system manager 208 can query the local database 210 for the status data. The status data can be returned to the local system manager 208, and the local system manager 208 can push the status data to the central system manager 204. The status data can be written to the central database 202 by the central system manager 204. Additionally, the central system manager 204 can write a central timestamp to the status data that is stored in the central database 202 based on a local clock of the central server 200. By employment of the scenario illustrated in FIG. 4, events that cannot and/or should not wait for a periodic updating of the local database 210 and central databases 202 can be reflected in the local database 210 and central databases 202 asynchronously.

Figure 5:
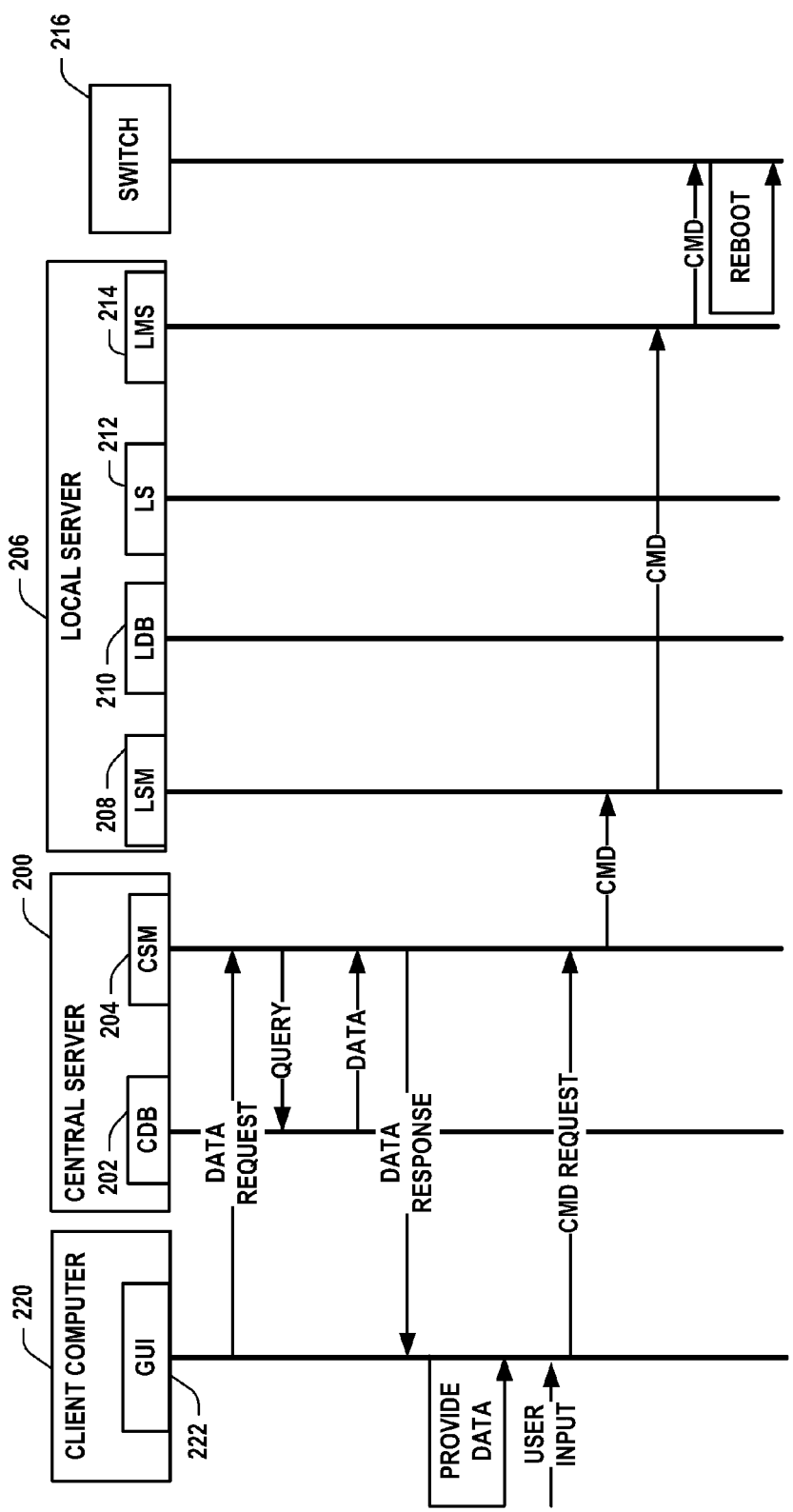
FIG. 5 illustrates an example of propagating a command from a client computer.

FIG. 5 depicts an example of a method implemented for monitoring and/or controlling a system from a client computer 220 (e.g., the client computer 30 illustrated in FIG. 1) via a GUI 222. At the start of the method it is presumed that the communication device 218 (illustrated in FIG. 3) is communicatively coupled (e.g., registered) with the switch 216, and that the switch 216 is communicatively coupled (e.g., registered) with the local management service 214. It is also presumed that configuration data and status for each of the local service 212, the switch 216 and the communication device 218 are stored in the local database 210 and the central database 202. In this example, it is also presumed that the client computer 220 is communicatively coupled to the central server 200, such as via an application programming interface (API).

In the illustrated example, the GUI 222 of the client computer 220 can provide a data request to the central system manager 204 of the central server 200. The data request can include, for example, data characterizing a status of the switch 216, the local service 212 and/or the communication device 218. In response to the data request, the central system manager 204 can query the central database 202 for the data identified in the data request. The central database 202 can respond with data corresponding to the data requested in the query. The central system manager 204 can provide a data response to the GUI 222 of the client computer 220 that can include the data requested in the query. This can include status update information, such as can be stored in the central database based on this disclosure. Moreover, the GUI 222 of the client computer 220 can output the data included in the data response in a manner recognizable by a user of the client computer 220 (e.g., a chart and/or a matrix).

Additionally, the GUI 222 can receive user input. In response to the user input, the GUI 222 can provide a command request to the central system manager 204. In the present scenario, it is presumed that the command request characterizes a request that the switch 216 be rebooted. However, in other examples, different command requests could be implemented. The central system manager 204 can provide a command corresponding to the command request to the local system manager 208. The local system manager 208 can provide the command to the local management service 214. The local management service 214 can provide the command to the switch 216, which command can instruct the switch 216 to reboot or perform other operations. Upon rebooting, for example, the switch 216 could provide a status, such as disclosed with respect to FIG. 4.

Figure 6:
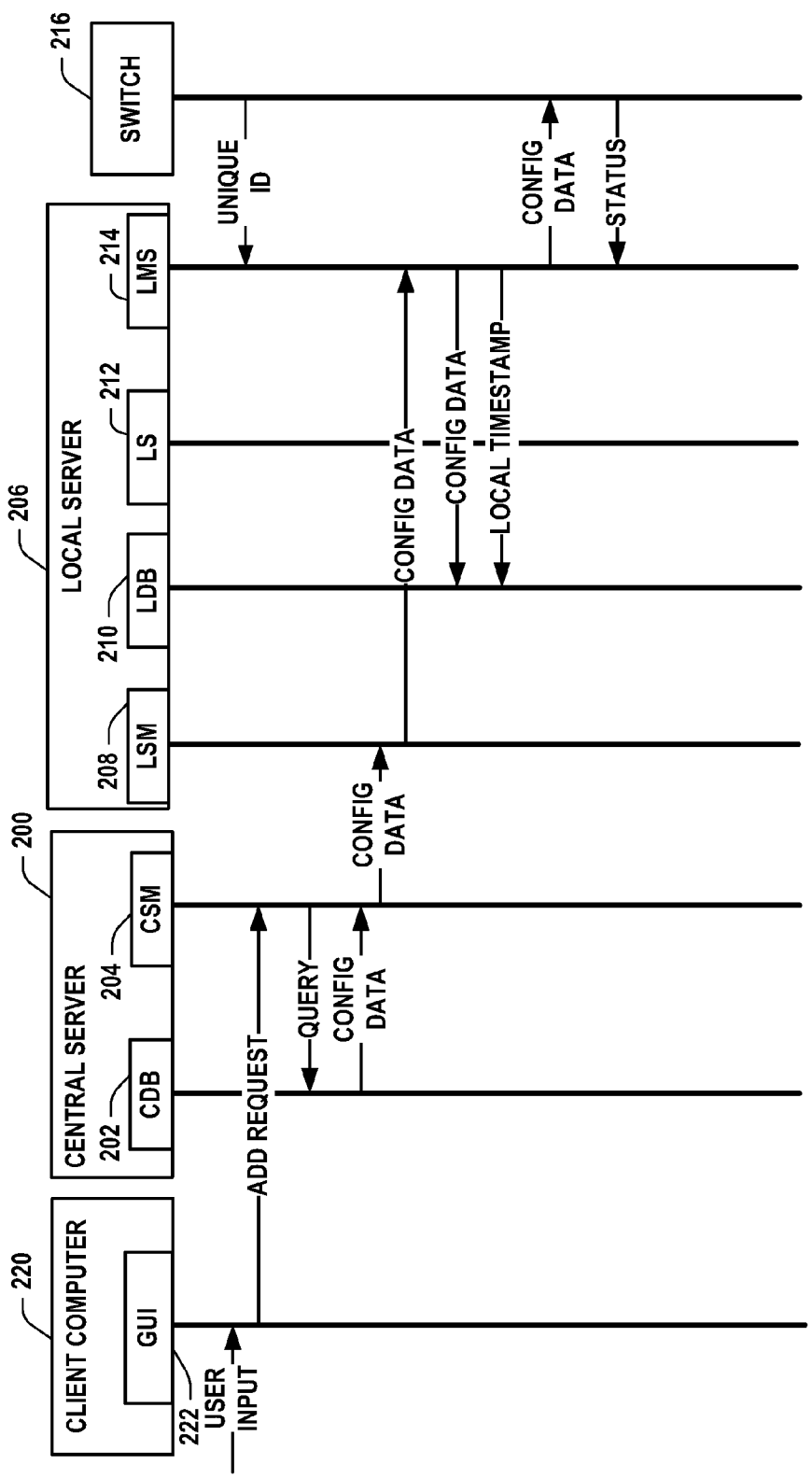
FIG. 6 illustrates another example of propagating a command from a client computer.

FIG. 6 depicts an example of a method implemented for adding a producer component to the system in response to a request from the client computer 220 via the GUI 222. In the example of FIG. 6, the component is demonstrated as a switch, although it is to be understood that other types of producer components (e.g., an interface, a port, an application, an appliance or the like) can also be added via such methods. At the start of the example method, it is presumed that the switch (e.g., or other producer component) 216 is not yet registered with the local management service 214 of the local server 206.

The switch 216 can provide a unique identifier or other indication that the switch 216 is online to the local management service 214, which unique identifier could be, for example, an IP address and/or a Media Access Control (MAC) address of the switch 216. The GUI 222 can receive a user input. In response to the user input, the GUI 222 of the client computer 220 can provide an add request to the central system manager 204. The add request can request that the switch 216 be added to (e.g., registered with) the local server 206. The central system manager 204 can query the central database 202 for configuration data for the switch 216. The central database 202 can respond with the configuration data. The configuration data can include, for example, parameters for the switch 216, and the unique ID of the switch 216. The central system manager 204 can provide the local system manager 208 with the configuration data. The local system manager 208 can provide the local management service 214 with the configuration data.

The local system manager 208 can write the configuration data to the local database 210. Additionally, the local management service 214 can write a metric, such as a local timestamp, as sequence number or the like with the configuration data based on the local time of the local server 206. The configuration data can be provided to the switch 216. The switch 216 can respond with a status of the switch 216 that can be processed, for example, in the manner illustrated and described with respect to FIG. 3.

Figure 7:
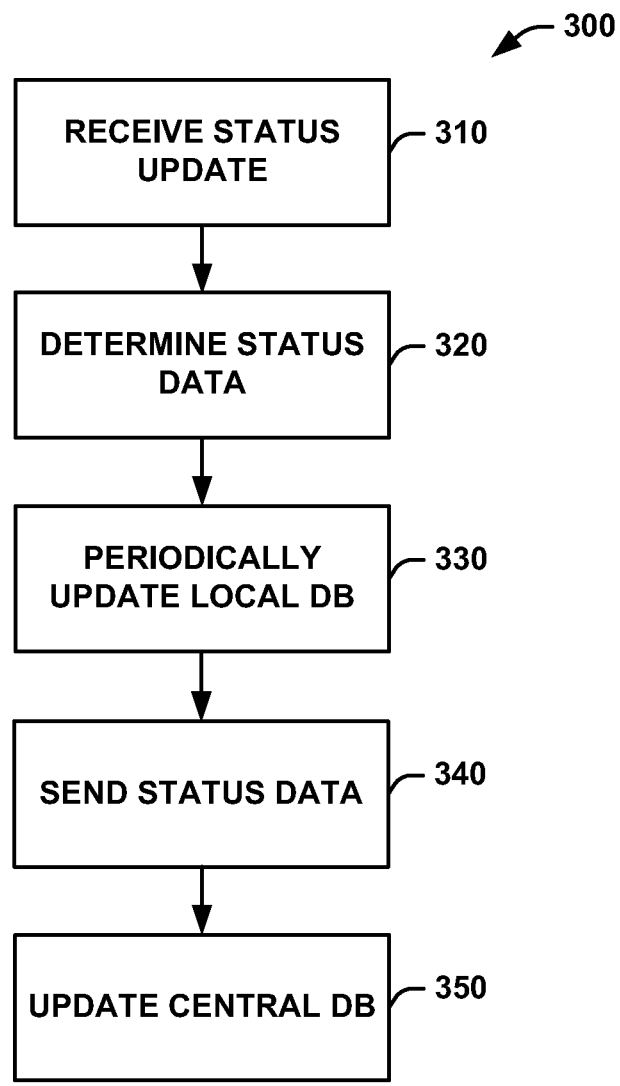
FIG. 7 illustrates an example flowchart of an example method for managing a local database and a central database.

FIG. 7 is a flowchart of an example method 300 for managing a hierarchical distributed database of status information for a telecommunications system (e.g., the system 2 of FIG. 1). At 310, a status update from one or more devices can be received. For example, from a switch (e.g., the switch 20 illustrated in FIG. 1) and a device (e.g., the device 22 illustrated in FIG. 1) associated with a local server (e.g., the local server 16 illustrated in FIG. 1 and/or the local server 100 illustrated in FIG. 2). At 320, status data for can be determined based on the received status update. At 330, a local database associated with the local server can be updated, periodically or asynchronously, based on analysis the status data. For example, the local database can be updated periodically according a local timestamp for the updates relative to the preceding timestamp update reference when last updated. Alternatively, for certain detected events (e.g., by event detector 116 of FIG. 2), the local database can be updated asynchronously. At 340, the status data can be provided to a central server computer (e.g., the central server 6 illustrated in FIG. 1) such as in response to status data being written to the local database—regardless of whether it is written periodically or asynchronously. At 350, a central database can be updated based on the status data to reflect the incremental updates received from the local database.

Figure 8:
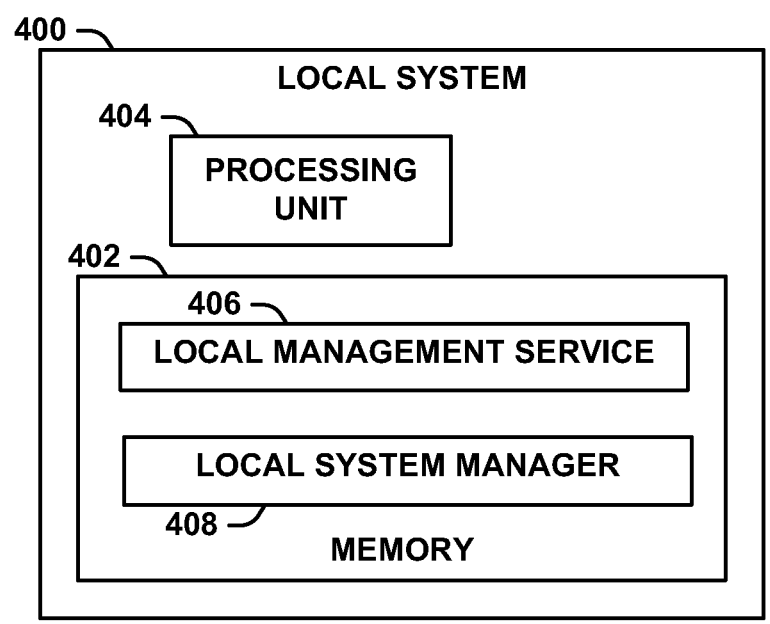
FIG. 8 illustrates an example of a local system.

FIG. 8 illustrates an example of a local system 400 (e.g., the local server 16 illustrated in FIG. 1 and/or the local server 100 illustrated in FIG. 2) for managing a hierarchical distributed database. The local system 400 can comprise a memory 402 to store machine readable instructions and a processing unit 404 to access the memory 402 and execute the machine readable instructions. The memory 402 can comprise a local management service 406 programmed to receive real-time status updates from one or more producers configured for operation with the local system 400, such as disclosed herein. Examples of producers include a switch, a device, an interface and a local service. The local management service 406 can determine status update data based on the real-time status updates. The local management service 406 can be configured to periodically and/or asynchronously write the status data to a local database. The local management service can control whether the status data is written periodically or asynchronously based on analysis of the status data. The local management service 406 can also signal (e.g., notify) a local system manager 408 stored in the memory 402 that the local database has been updated. The timing for the updates can vary for different events in the local system, for example. The local system manager 408 can be configured to push the status update data across a network to a central system manager (e.g., the central system manager 12 illustrated in FIG. 1), such as via a predefined message format. The status update data pushed to the central system manager thus includes only data changed in the local database.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A non-transitory computer readable medium having machine readable instructions stored therein, the machine readable instructions comprising:
   a local management service programmed to:
      receive real-time status information from producer components registered within the local management service;

determine status data for at least one of the producer components based on the real-time status information thereof, the status data corresponding to changes in the status information for the at least one of the producer components;

select between a periodic and an asynchronous propagation of the status data to a local database based on the real-time status information for the at least one of the producer components; and a local system manager programmed to push the status data from the local database across a network to a central system manager to facilitate a storing of the status data in a central database, wherein the status data pushed to the central system manager includes only status data changed in the local database;

wherein the central system manager is programmed to write the status data in a status database record that is associated with the local management service into the central database; and wherein the local management service further comprises an event detector programmed to detect an asynchronous status event in response receiving a predetermined type of real-time status information, the local management service being further programmed to propagate the status data for the predetermined type of real-time status update asynchronously to the local database based on detection of the asynchronous status event at the event detector.

2. The medium of claim 1, wherein local system manager is programmed to periodically push the status data to the central system manager.

3. The medium of claim 1, wherein the status data is propagated to the local database with a local timestamp based on a time local to the local management service, the local system manager being programmed to select the status data that has changed based on comparing the local timestamp relative to a timestamp reference and to send to the central database the selected status data that has changed.

4. The medium of claim 1, wherein the machine readable instructions further comprises a local service programmed to:
manage communication services to the producer components; and
provide real-time status updates of the local service to the local management service.

5. The medium of claim 1, wherein the producer components comprise a hierarchical arrangement of communication devices, the local management service being programmed to control and monitor each of the communication devices registered therewith.

6. The medium of claim 1, wherein the local database contains a proper subset of the status data stored in the central database.

7. The medium of claim 1, wherein the local management service further comprises a clean-up function programmed to propagate changes in configuration data, corresponding to a deletion of a given producer component, by adding deletion data to the status data associated with the given producer component, the deletion data being sent to the central database with the status data, the clean-up function removing a record for the given producer component from the status data in the local database after the deletion data is sent.

8. The medium of claim 1, wherein the machine readable instructions further comprise a user interface programmed to provide, in response to a user input, an output visualization based on the status data in the central database.

9. A non-transitory computer readable medium having machine readable instructions stored therein, the machine readable instructions comprising:
a local management service programmed to:
receive real-time status information from producer components registered within the local management service;
determine status data for at least one of the producer components based on the real-time status information thereof, the status data corresponding to changes in the status information for the at least one of the producer components;
select between a periodic and an asynchronous propagation of the status data to a local database based on the real-time status information for the at least one of the producer components; and
a local system manager programmed to push the status data from the local database across a network to a central system manager to facilitate a storing of the status data in a central database, wherein the status data pushed to the central system manager includes only status data changed in the local database, wherein the status data is propagated to the local database with a local timestamp based on a time local to the local management service, the local system manager being programmed to select the status data that has changed based on comparing the local timestamp relative to a timestamp reference and to send to the central database the selected status data that has changed, wherein the central system manager is programmed to write the status data in a status database record that is associated with the local management service into the central database.

10. The medium of claim 9, wherein the status data is written to the central database with a central timestamp based on a time local to the central system manager.

11. A non-transitory computer readable medium having machine readable instructions stored therein, the machine readable instructions comprising:
a local management service programmed to:
receive real-time status information from producer components registered within the local management service;
determine status data for at least one of the producer components based on the real-time status information thereof, the status data corresponding to changes in the status information for the at least one of the producer components;
select between a periodic and an asynchronous propagation of the status data to a local database based on the real-time status information for the at least one of the producer components; and
a local system manager programmed to push the status data from the local database across a network to a central system manager to facilitate a storing of the status data in a central database, wherein the status data pushed to the central system manager includes only status data changed in the local database, wherein the status data comprises status information collected for a hierarchical arrangement of the producer components, the local management service being programmed to implement changes in the status data for at least one producer component in the hierarchical arrangement of the producer components based on a change in status information received, which is stored in the local database as corresponding status data, for another producer component in the hierarchical arrangement of the producer components.

12. A non-transitory computer readable medium having machine readable instructions stored therein, the machine readable instructions comprising:
- a local management service programmed to:
  - receive real-time status information from producer components registered within the local management service;
  - determine status data for at least one of the producer components based on the real-time status information thereof, the status data corresponding to changes in the status information for the at least one of the producer components;
  - select between a periodic and an asynchronous propagation of the status data to a local database based on the real-time status information for the at least one of the producer components; and
- a local system manager programmed to push the status data from the local database across a network to a central system manager to facilitate a storing of the status data in a central database, wherein the status data pushed to the central system manager includes only status data changed in the local database;
- wherein the local management service further comprises a clean-up function programmed to propagate changes in configuration data, corresponding to a deletion of a given producer component, by adding deletion data to the status data associated with the given producer component, the deletion data being sent to the central database with the status data, the clean-up function removing, a record for the given producer component from the status data in the local database after the deletion data is sent;
- wherein the clean-up function is programmed to cascade the deletion data through corresponding status data for at least one other producer component that is in a hierarchical grouping within the given producer component.

13. A system comprising:
- a central server communicatively coupled to a plurality of local servers over a network, each local server comprising: at least one or more processors;
  - a local management service programmed to:
    - receive real-time status information from producer components registered within the local management service;
    - determine status data based on the real-time status information, the status data corresponding to changes in the status information for at least one of the producer components;
    - select between a periodic and an asynchronous propagation of the status data to a local database based on the status data for the at least one of the producer components; and
    - propagate the status data to a local database based on the selecting; and
  - a local system manager programmed to push the status data via the network to a central system manager of the central server to facilitate a storing of the status data in a central database, wherein the status data pushed to the central system manager includes only status data changed in the local database;
- the central system manager of the central server being programmed to:
  - receive the status data from the local system manager associated with each of the plurality of local servers; and
  - write the status data to the central database in a record associated with each respective local server;
- wherein the local management service of each local server further comprises an event detector programmed to detect a predetermined type of real-time status update, the local management service being programmed to propagate the status data for the predetermined type of real-time status update asynchronously to the respective local database based on the event detector detecting the predetermined type of real-time status update.

14. The system of claim 13, wherein the local management service for each local server is further programmed to include a local timestamp with the status data written to the local database, the local timestamp being based on a time local to the local management service.

15. The system of claim 14, wherein the central system manager of the central server is further programmed to include a central timestamp with the status data written to the central database, the central timestamp being based on a time local to the central system manager, and being different than the local timestamp.

16. The system of claim 14, wherein the local system manager is programmed to select the status data that has changed based on comparing the local timestamp relative to a timestamp reference and to send to the central database the selected status data that has changed.

17. The system of claim 13, wherein each local server of the plurality of local servers is associated with a unique record in the central database and each local database associated with each local system manager stores a proper subset of the status data stored in the central database.

18. The system of claim 13, further comprising a client application programmed to provide a request to the central system manager for a status for one or more producer components registered for operation in the system.

19. The system of claim 18, wherein the client application is programmed to send an add request to the central system manager, the add request being a request to add a given producer component to a plurality of producer component registered for operation with a given local server;
- wherein the central system manager is programmed to:
  - retrieve configuration data from the central database in response to the add request; and
  - provide an add command that includes the configuration data to a given local system manager associated with the given local server;
- wherein the local management service of the given local server is programmed to:
  - receive the add command from the given local system manager; and
  - send the configuration data to the given producer component in response to receiving an indication that the given producer component is online.

20. The system of claim 13, wherein the predetermined type of real-time status update comprises a reboot status for a given one of the producer components.

21. The system of claim 13, wherein the local management service of each local server further comprises a clean-up function programmed to propagate changes in configuration data, corresponding to a deletion of a given producer component, by adding deletion data to the status data associated with the given producer component, the deletion data being sent to the central database with the status data, the clean-up function removing a corresponding record for the given producer component from the status data in the local database after the deletion data is sent.

22. The system of claim 21, wherein the clean-up function is programmed to cascade the deletion data through corresponding status data for at least one other producer component that is in a hierarchical grouping within the given producer component.

23. The system of claim 13, wherein the central system manager of the central server is further programmed to aggregate the status data in records for each of a plurality of logical levels of system hierarchy.

24. The system of claim 13, wherein at least one of the plurality of logical levels of system hierarchy includes producers from different local servers.

25. A system comprising:
a central server communicatively coupled to a plurality of local servers over a network, each local server comprising: at least one or more processors;
a local management service programmed to:
receive real-time status information from producer components registered within the local management service;
determine status data based on the real-time status information, the status data corresponding to changes in the status information for at least one of the producer components;
select between a periodic and an asynchronous propagation of the status data to a local database based on the status data for the at least one of the producer components; and
propagate the status data to a local database based on the selecting; and
a local system manager programmed to push the status data via the network to a central system manager of the central server to facilitate a storing of the status data in a central database, wherein the status data pushed to the central system manager includes only status data changed in the local database;
the central system manager of the central server being programmed to:
receive the status data from the local system manager associated with each of the plurality of local servers; and
write the status data to the central database in a record associated with each respective local server; and
a client application programmed to:
provide a request to the central system manager for a status for one or more producer components registered for operation in the system; and
send a command request to the central system manager for a given producer component registered for operation with a given local server of the plurality of local servers;
wherein the central system manager is programmed to provide a command to a given local system manager associated with the given local server that is associated with the given producer component; and
wherein the local management service of the given local server is programmed to:
receive the command from the given local system manager; and
send the command to the given producer component, wherein the given producer component is programmed to execute the command.

26. A system comprising:
a central server communicatively coupled to a plurality of local servers over a network, each local server comprising: at least one or more processors;
a local management service programmed to:
receive real-time status information from producer components registered within the local management service;
determine status data based on the real-time status information, the status data corresponding to changes in the status information for at least one of the producer components;
select between a periodic and an asynchronous propagation of the status data to a local database based on the status data for the at least one of the producer components; and
propagate the status data to a local database based on the selecting; and
a local system manager programmed to push the status data via the network to a central system manager of the central server to facilitate a storing of the status data in a central database, wherein the status data pushed to the central system manager includes only status data changed in the local database;
the central system manager of the central server being programmed to:
receive the status data from the local system manager associated with each of the plurality of local servers; and
write the status data to the central database in a record associated with each respective local server;
wherein each of the producer components comprises a hierarchical arrangement of communication devices, each of the communication devices being registered for operation with at least one respective local service, the respective local service being programmed to control and monitor each communication device that is registered therewith, and
wherein the local management service of each local servers further being programmed to implement changes in status information for at least one communication device in the hierarchical arrangement of communication devices based on a change in status information received for another communication device in the hierarchical arrangement of communication devices.

27. A system comprising;
a central server communicatively coupled to a plurality of local servers over a network, each local server comprising: at least one or more processors;
a local management service programmed to:
receive real-time status information from producer components registered within the local management service, wherein the real-time status information from each of the producer components comprises a connectivity status that characterizes connectivity between a given producer component and the other producer components;
determine status data based on the real-time status information, the status data corresponding to changes in the status information for at least one of the producer components; and
propagate the status data to a local database, periodically or asynchronously depending on the status data; and
a local system manager programmed to:
push the status data via the network to a central system manager of the central server to facilitate a storing of the status data in a central database, wherein the status data pushed to the central system manager includes only status data changed in the local database; and
determine an optimized connectivity list for the producer components based on connectivity status of each of the producers components, and changes to the optimized connectivity list being included with
the status data pushed to the central server;
the central system manager of the central server being
programmed to:
receive the status data from the local system manager
associated with each of the plurality of local servers;
write the status data to the central database in a record
associated with each respective local server; and
derive a connectivity matrix for the system based on the
changes to the optimized connectivity list included in
the status data, the connectivity matrix characterizing
a connectivity status of each producer component in
the system.

* * * * *